US012603351B2

(12) United States Patent
Lee et al.

(10) Patent No.: US 12,603,351 B2
(45) Date of Patent: Apr. 14, 2026

(54) BATTERY MODULE WITH IMPROVED COOLING PERFORMANCE AND BATTERY PACK INCLUDING THE SAME

(71) Applicant: LG ENERGY SOLUTION, LTD., Seoul (KR)

(72) Inventors: Jung Hoon Lee, Daejeon (KR); Jae Hun Yang, Daejeon (KR); Sang Yoon Jeong, Daejeon (KR); Jong Soo Ha, Daejeon (KR); Se Ho Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 803 days.

(21) Appl. No.: 17/909,519

(22) PCT Filed: Aug. 19, 2021

(86) PCT No.: PCT/KR2021/011016
§ 371 (c)(1),
(2) Date: Sep. 6, 2022

(87) PCT Pub. No.: WO2022/059936
PCT Pub. Date: Mar. 24, 2022

(65) Prior Publication Data
US 2023/0352764 A1     Nov. 2, 2023

(30) Foreign Application Priority Data
Sep. 21, 2020     (KR) ........................ 10-2020-0121150

(51) Int. Cl.
H01M 10/6554     (2014.01)
H01M 10/613     (2014.01)
(Continued)

(52) U.S. Cl.
CPC ..... H01M 10/6554 (2015.04); H01M 10/613 (2015.04); H01M 10/653 (2015.04);
(Continued)

(58) Field of Classification Search
CPC ............ H01M 10/613; H01M 10/647; H01M 10/653; H01M 10/6554; H01M 10/6555;
(Continued)

(56) References Cited

U.S. PATENT DOCUMENTS

2005/0123828 A1     6/2005   Oogami et al.
2005/0231158 A1     10/2005  Higashino
(Continued)

FOREIGN PATENT DOCUMENTS

CN     110970582 A     4/2020
EP     3 018 731 A1    5/2016
(Continued)

OTHER PUBLICATIONS

Machine translation of JP2014157721 (Year: 2025).*
(Continued)

*Primary Examiner* — Lingwen R Zeng
(74) *Attorney, Agent, or Firm* — Birch, Stewart, Kolasch & Birch, LLP

(57) ABSTRACT

Discussed is a battery module including a heat sink having a predetermined area, the heat sink being horizontally located, a support plate including an upper support plate and a lower support plate located respectively at an upper surface and a lower surface of the heat sink, a battery cell including a first battery cell disposed in contact with the upper support plate and a second battery cell disposed in contact with the lower support plate, and a cover plate including an upper cover plate located above the first battery cell and a lower cover plate located under the second battery cell.

19 Claims, 8 Drawing Sheets

(51) Int. Cl.

| | | |
|---|---|---|
| *H01M 10/653* | (2014.01) | |
| *H01M 50/271* | (2021.01) | |
| *H01M 50/507* | (2021.01) | |
| *H01M 10/647* | (2014.01) | |
| *H01M 10/6555* | (2014.01) | |
| *H01M 10/6557* | (2014.01) | |
| *H01M 50/211* | (2021.01) | |
| *H01M 50/264* | (2021.01) | |
| *H01M 50/503* | (2021.01) | |

(52) U.S. Cl.

CPC ....... *H01M 50/271* (2021.01); *H01M 50/507* (2021.01); *H01M 10/647* (2015.04); *H01M 10/6555* (2015.04); *H01M 10/6557* (2015.04); *H01M 50/211* (2021.01); *H01M 50/264* (2021.01); *H01M 50/503* (2021.01); *Y02E 60/10* (2013.01)

(58) Field of Classification Search

CPC .......... H01M 10/6557; H01M 50/211; H01M 50/264; H01M 50/271; H01M 50/503; H01M 50/507; Y02E 60/10

See application file for complete search history.

(56) References Cited

U.S. PATENT DOCUMENTS

| | | | | |
|---|---|---|---|---|
| 2008/0233470 | A1* | 9/2008 | Zhu | F28D 15/0266 165/104.28 |
| 2012/0003521 | A1* | 1/2012 | Sohn | F28D 15/0266 429/120 |
| 2013/0045410 | A1 | 2/2013 | Yang et al. | |
| 2013/0309642 | A1 | 11/2013 | Memiman et al. | |
| 2015/0000134 | A1 | 1/2015 | Merriman et al. | |
| 2015/0349392 | A1 | 12/2015 | Smith et al. | |
| 2016/0268657 | A1 | 9/2016 | Park et al. | |
| 2019/0312319 | A1 | 10/2019 | Choi et al. | |
| 2020/0220128 | A1 | 7/2020 | Kim et al. | |
| 2020/0388805 | A1 | 12/2020 | Yoo et al. | |
| 2021/0005943 | A1 | 1/2021 | Park et al. | |
| 2021/0194099 | A1 | 6/2021 | Kim et al. | |
| 2024/0322385 | A1 | 9/2024 | Kim et al. | |

FOREIGN PATENT DOCUMENTS

| | | | | |
|---|---|---|---|---|
| JP | 2014157721 | A | * | 8/2014 |
| JP | 2015-522911 | A | | 8/2015 |
| JP | 2018-39111 | A | | 3/2016 |
| JP | 2017-517850 | A | | 6/2017 |
| JP | 2018-6043 | A | | 1/2018 |
| JP | 6331863 | B2 | | 5/2018 |
| KR | 10-2005-0035112 | A | | 4/2005 |
| KR | 10-2006-0045008 | A | | 5/2006 |
| KR | 10-2011-0126764 | A | | 11/2011 |
| KR | 10-2016-0065637 | A | | 6/2016 |
| KR | 10-2016-0109679 | A | | 9/2016 |
| KR | 10-2018-0091600 | A | | 8/2018 |
| KR | 10-2019-0012998 | A | | 2/2019 |
| KR | 10-2019-0064835 | A | | 6/2019 |
| KR | 10-2020-0002601 | A | | 1/2020 |
| KR | 10-2020-0030964 | A | | 3/2020 |
| KR | 10-2020-0030968 | A | | 3/2020 |

OTHER PUBLICATIONS

Extended European Search Report for European Application No. 21869559.1, dated Jul. 18, 2024.

International Search Report (PCT/ISA/210) issued in PCT/KR2021/011016 mailed on Nov. 26, 2021.

* cited by examiner

【FIG. 1】
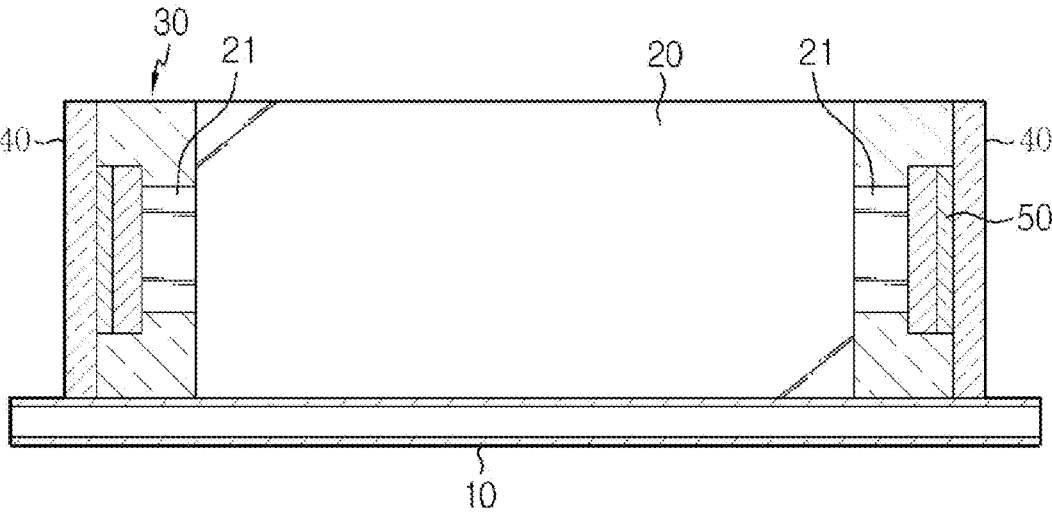
【FIG. 2】
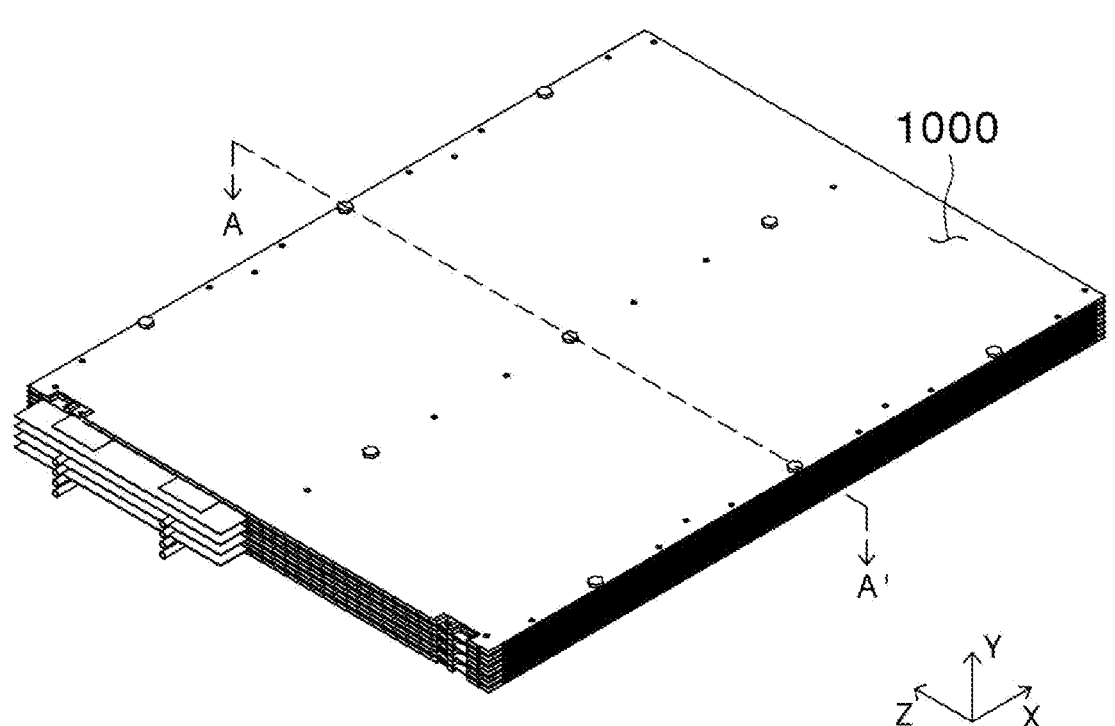

【FIG. 3】
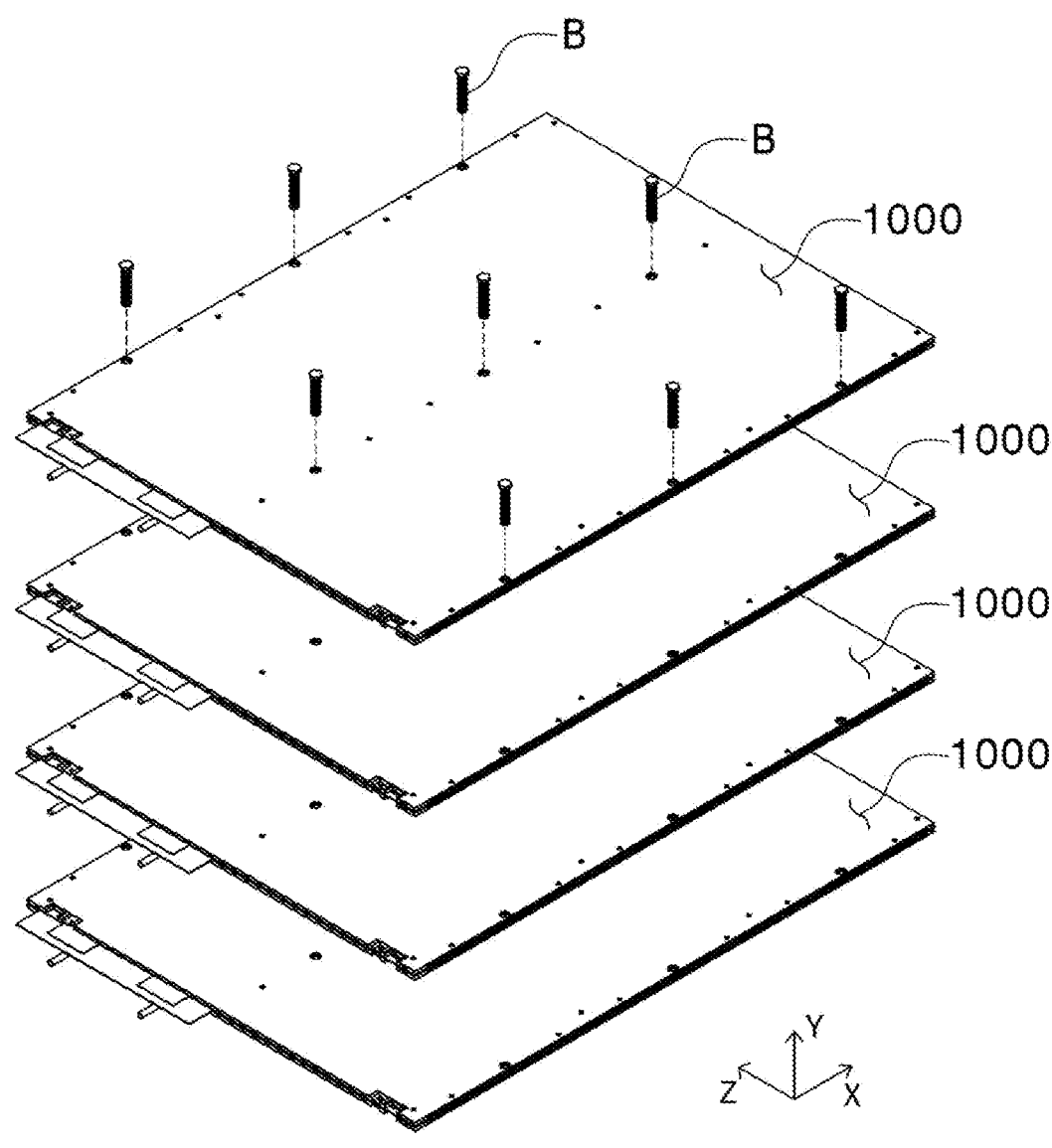

【FIG. 4】
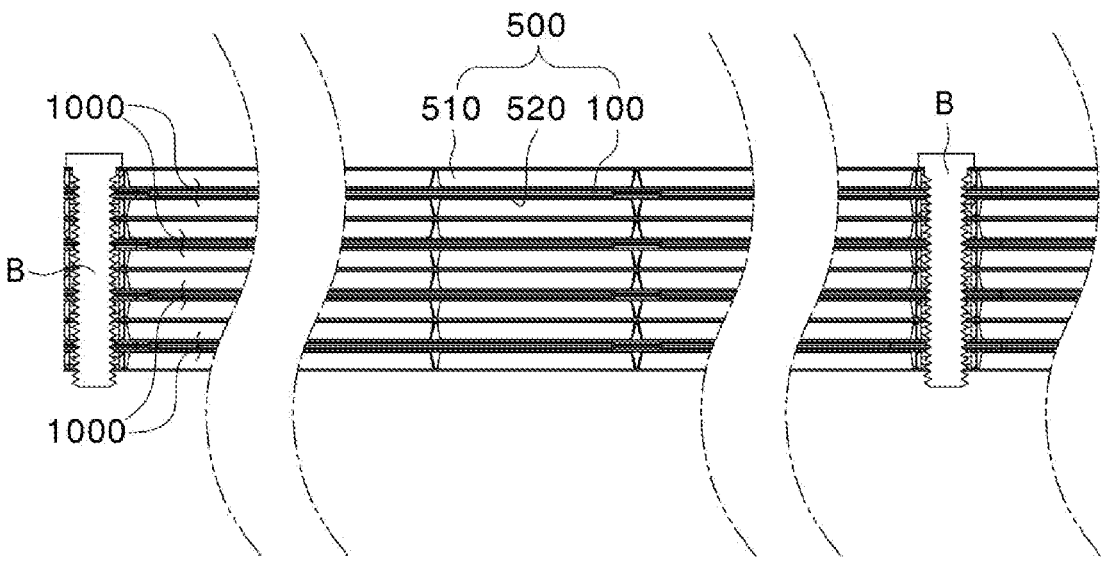

【FIG. 5】
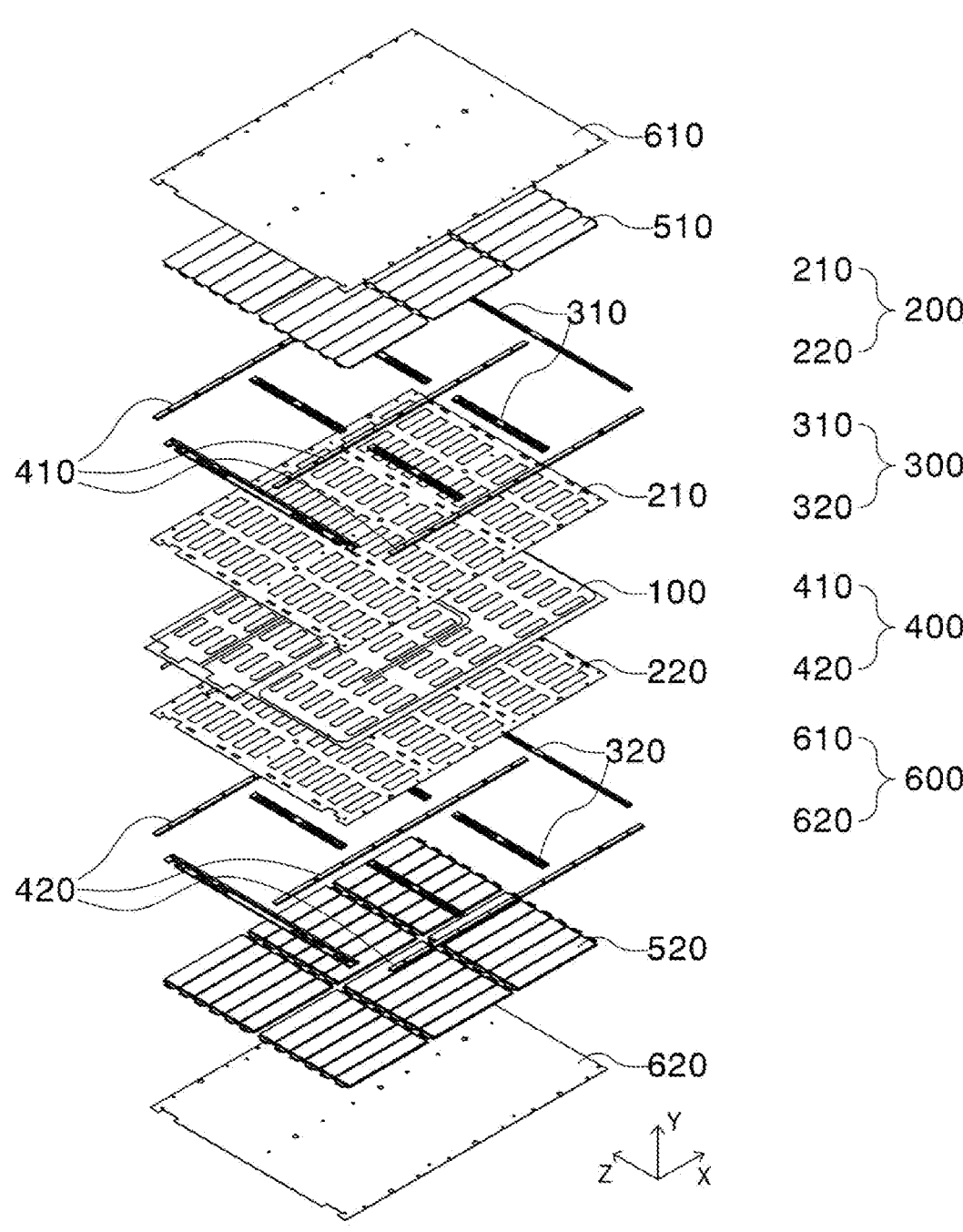

【FIG. 6】
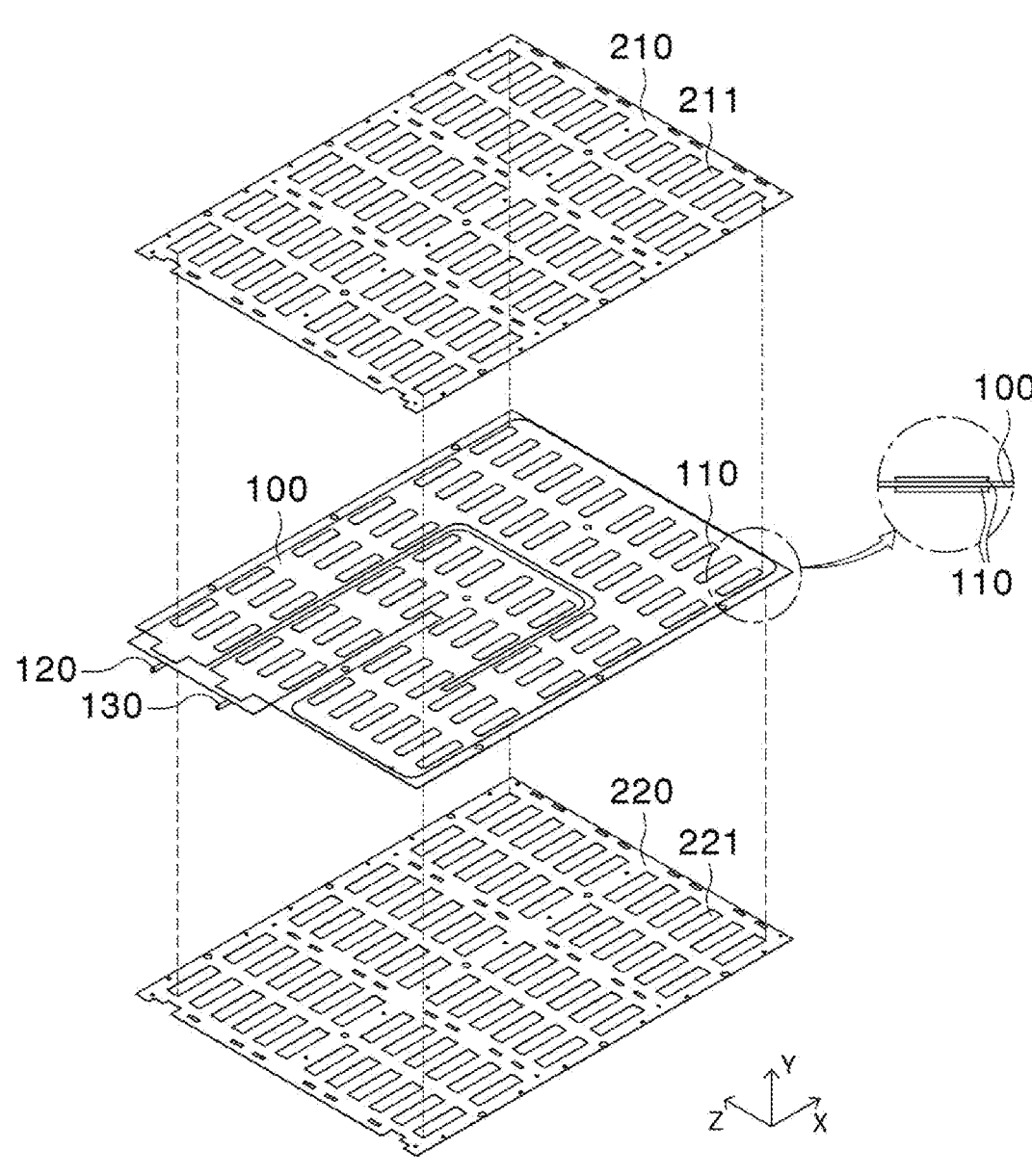

【FIG. 7】
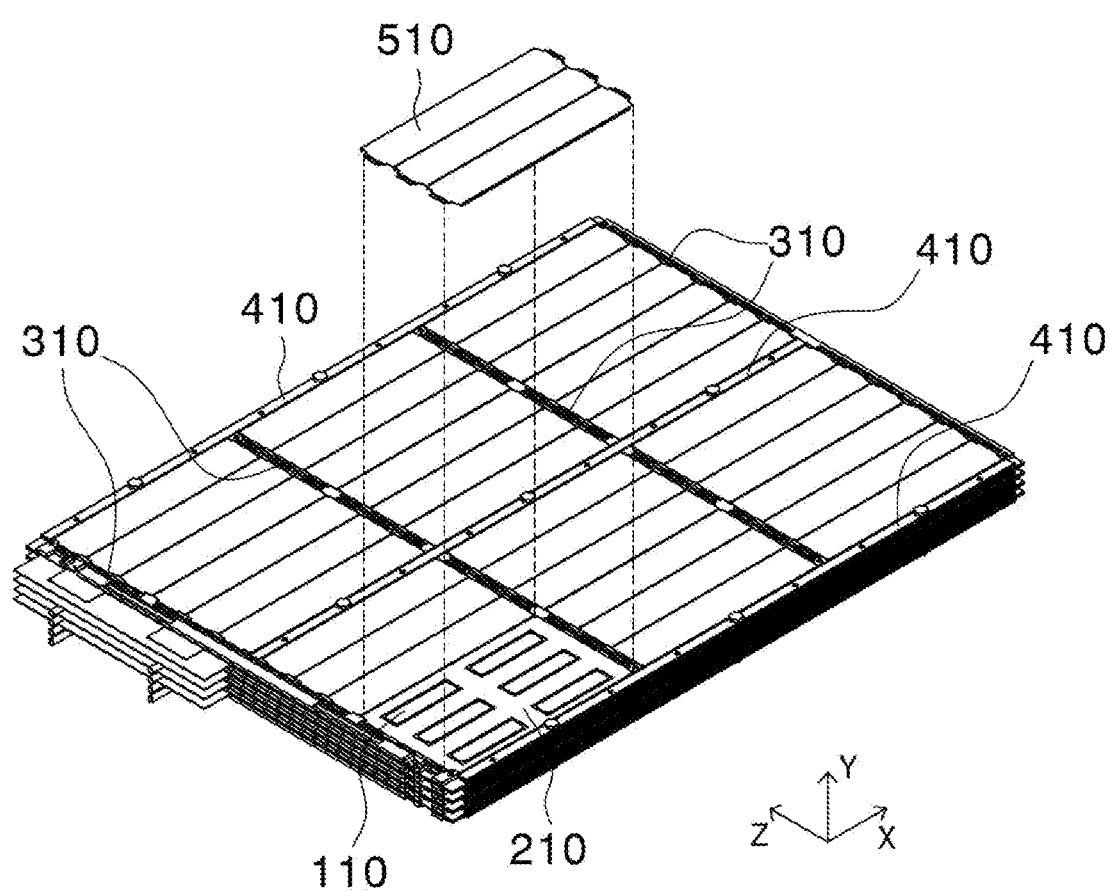

【FIG. 8】
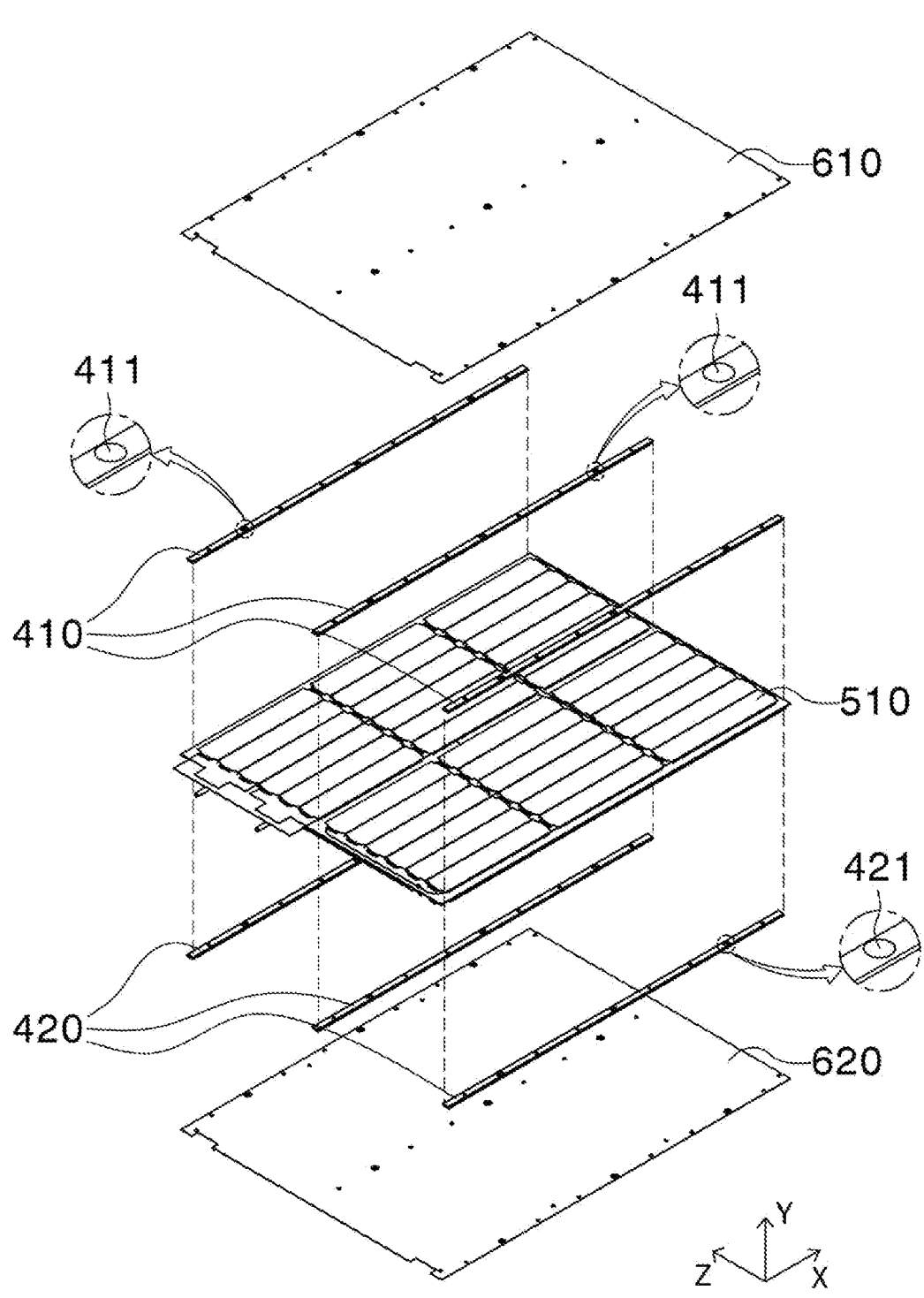

【FIG. 9】
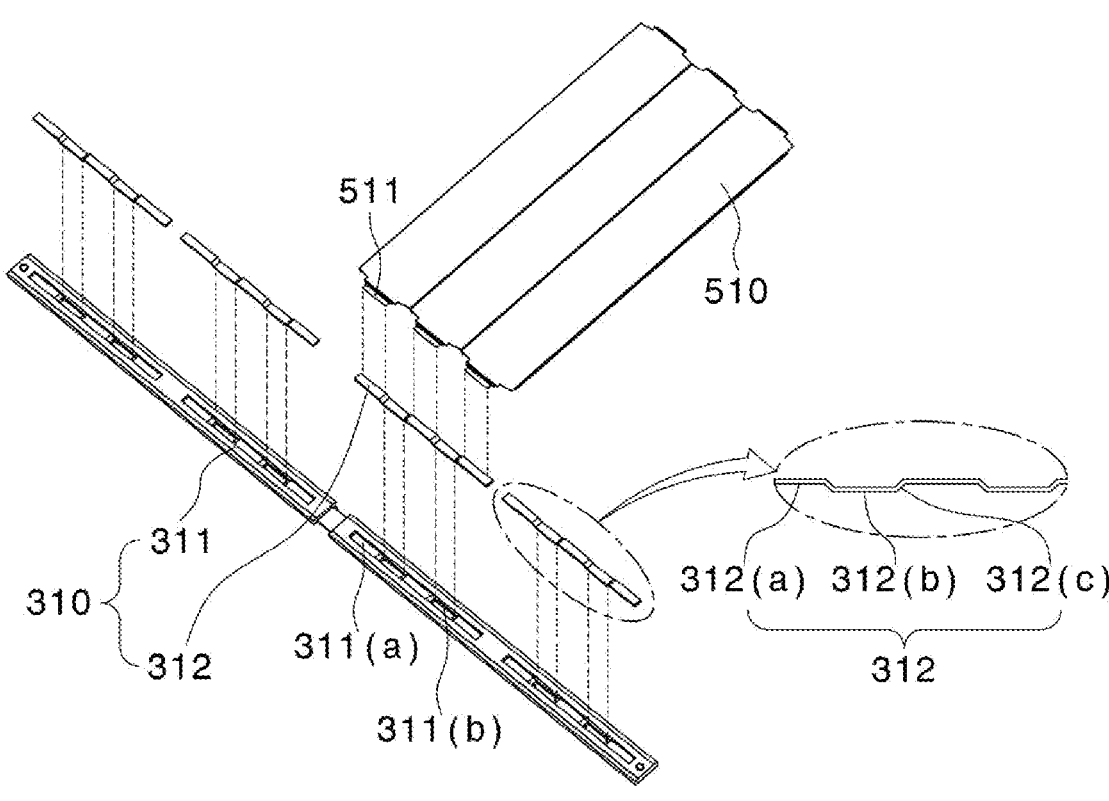

BATTERY MODULE WITH IMPROVED COOLING PERFORMANCE AND BATTERY PACK INCLUDING THE SAME

TECHNICAL FIELD

This application claims the benefit of priority to Korean Patent Application No. 2020-0121150 filed on Sep. 21, 2020, the disclosure of which is incorporated herein by reference in its entirety.

The present invention relates to a battery module and a battery pack including the same, and more particularly to a battery module configured such that the area of heat exchange between a battery cell, which generates heat, and a heat sink is increased and heat exchange between a busbar and the neat sink is also performed, whereby cooling performance of the battery module is improved, and a battery pack including the same.

BACKGROUND ART

With recent development of alternative energies due to air pollution and energy depletion caused as the result of use of fossil fuels, demand for secondary batteries capable of storing electrical energy that is produced has increased. The secondary batteries, which are being capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

In the battery module or the battery pack, a plurality of battery cells is connected to each other in series or in parallel in order to increase capacity and output of the battery module or the battery pack. In this case, a problem, such as overload, may occur, since the plurality of battery cells is connected to each other. In particular, for the battery module, in which the plurality of battery cell is received, there is a problem in that temperature in the battery module increases due to overload, whereby abnormality of the battery is amplified. In order to solve this problem, a general battery module is provided with a heat sink configured to remove heat generated in a battery in order to maintain battery temperature.

FIG. 1 is a sectional view showing a cooling structure of a conventional battery module. As shown in FIG. 1, the conventional battery module includes a plurality of battery cells 20 disposed perpendicular to a heat sink 10 and a pair of cooling plates 40 connected perpendicularly to the heat sink 10, the cooling plates being in direct contact with a busbar assembly 30.

The conventional battery module is configured to have a structure in which heat generated from the battery cells 20 having leads 21 and the busbar assembly 30 is removed by the heat sink 10 and the cooling plates 40. However, a heat dissipation effect is low, and the size of the battery module is large.

That is, since the heat sink 10 and the battery cells 20 are in contact with each other in a state of being disposed perpendicular to each other, the area of contact therebetween is small, whereby it is difficult to rapidly remove heat generated from the battery cells 20 and a heat dissipation effect is low. Furthermore, separate cooling plates 40 and heat transfer members 50 are needed in order to cool the busbar assembly 30, whereby the overall volume of the battery module increased, and therefore energy density of the battery module is reduced.

PRIOR ART DOCUMENT (Patent Document 1) Korean Patent Application Publication No. 2020-0030968

DISCLOSURE

Technical Problem

The present invention has been made in view of the above problems, and it is an object of the present invention to provide a battery module with improved cooling performance capable of inhibiting occurrence of a secondary problem due to heat generation by efficiently removing heat generated from a battery cell and a battery pack including the same.

It is another object of the present invention to provide a battery module with improved cooling performance capable of cooling a bushes using a battery cell cooling member, whereby an increase in volume of the battery module is minimized, and a battery pack including the same.

It is a further object of the present invention to provide a battery module with improved cooling performance capable of reducing a battery cell cooling deviation by increasing adhesion force and a battery pack including the same.

Technical Solution

In order to accomplish the above objects, a battery module according to the present invention includes a heat sink having a predetermined area, the heat sink being horizontally located; a support plate including an upper support plate and a lower support plate located respectively at the upper surface and the lower surface of the heat sink; a battery cell including a first battery cell disposed in tight contact with the upper support plate and a second battery cell disposed in tight contact with the lower support plate; and a cover plate including an upper cover plate located above the first battery cell and a lower cover plate located under the second battery cell.

Also, in the battery module according to the present invention, the heat sink may be provided on the upper surface thereof with a protuberance protruding by a predetermined height, and the upper support plate may be provided with a first opening configured to receive the protuberance.

Also, in the battery module according to the present invention, the first battery cell may be located at the upper surface of the protuberance.

Also, in the battery module according to the present invention, the heat sink may be provided on the lower surface thereof with a protuberance protruding by a predetermined height, and the lower support plate may be provided with a second opening configured to receive the protuberance.

Also, in the battery module according to the present invention, the second battery cell may be located at the lower surface of the protuberance.

3

Also, in the battery module according to the present invention, a thermally conductive resin layer may be interposed between the first battery cell and the protuberance and between the second battery cell and the protuberance.

Also, in the battery module according to the present invention, first support frames may be located between the upper support plate and the upper cover plate so as to extend along opposite edges of each thereof while having a predetermined height and width.

Also, in the battery module according to the present invention, a first support frame may be located between the upper support plate and the upper cover plate so as to extend along the middle of each thereof while having a predetermined height and width.

Also, in the battery module according to the present invention, second support frames may be located between the lower support plate and the lower cover plate so as to extend along opposite edges of each thereof while having a predetermined height and width.

Also, in the battery module according to the present invention, a second support frame may be located between the lower support plate and the lower cover plate so as to extend along the middle of each thereof while having a predetermined height and width.

Also, in the battery module according to the present invention, a first busbar assembly may be located between the upper support plate and the upper cover plate.

Also, in the battery module according to the present invention, the first busbar assembly may include a first busbar frame having a first receiving recess formed therein and a busbar seated in the first receiving recess, the busbar being configured to have a concave-convex structure that is bent at a predetermined angle a plurality of times.

Also, in the battery module according to the present invention, a second busbar assembly may be located between the lower support plate and the lower cover plate.

In addition, the present invention provides a battery pack including a battery module having at least one of the above-mentioned features.

In addition, the present invention provides a device including the battery pack.

Advantageous Effects

As is apparent from the above description, a battery module with improved cooling performance according to the present invention and a battery pack including the same have an advantage in that relatively wide side surfaces of battery cells and a heat sink are in tight contact with each other in a state of being located in a horizontal direction, whereby cooling performance of the battery cells is improved due to an increase in heat transfer area.

In addition, the battery module with improved cooling performance according to the present invention and the battery pack including the same have a merit in that the heat sink, which is configured to cool the battery cells, and a busbar are in contact with each other, whereby no separate heat sink is necessary.

Furthermore, the battery module with improved cooling performance according to the present invention and the battery pack including the same have an advantage in that the battery cells, the heat sink, a support plate, etc. are fastened to each other via a plurality of support frames and fastening members, whereby it is Possible to maintain uniform adhesion force between the battery cells and the heat sink while maximizing space utilization.

DESCRIPTION OF DRAWINGS

FIG. 1 is a sectional view showing a cooling structure of a conventional battery module.

FIG. 2 is a perspective view of a battery pack according to a preferred embodiment of the present invention.

FIG. 3 is an exploded perspective view of the battery pack shown in FIG. 2.

FIG. 4 is a sectional view taken along line A-A' of FIG. 2.

FIG. 5 is an exploded perspective view of a battery module according to a preferred embodiment of the present invention.

FIG. 6 is a perspective view illustrating a coupling structure between a heat sink and a support plate in the battery module according to the preferred embodiment of the present invention.

FIG. 7 is a perspective view illustrating a battery cell mounting structure in the battery module according to the preferred embodiment of the present invention.

FIG. 8 is a perspective view illustrating a support frame disposition structure in the battery module according to the preferred embodiment of the present invention.

FIG. 9 is a perspective view illustrating a coupling structure between battery cells and busbars in the battery module according to the preferred embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module with improved cooling performance according to the present invention and a battery pack including the same will be described with reference to the accompanying drawings.

FIG. 2 is a perspective view of a battery pack according to a preferred embodiment of the present invention, FIG. 3 is an exploded perspective view of the battery pack shown in FIG. 2, and FIG. 4 is a sectional view taken along line A-A' of FIG. 2.

As shown in FIGS. 2 to 4, the battery pack according to the present invention is configured such that a plurality of battery modules 1000 is horizontally stacked. The battery modules 1000 are fixed using a plurality of fastening members B.

Here, each of the fastening members B may be, for example, a bolt provided with a screw thread, and a nut, which is fastened to the portion of the fastening member that protrudes from the lower surface of a lower cover plate 620 after being inserted through the battery pack, may be further provided.

Although not shown in the figures, the battery modules 1000 may be received in a separate case (not shown) in the state in which the battery modules are fixed using the fastening members Depending on circumstances, after being received in the case (not shown), the battery modules 1000 may be fixed together with the case (not shown) using the fastening members B.

FIG. 5 an exploded perspective view of a battery module according to a preferred embodiment of the present invention. As shown in FIG. 5, the battery module 1000 includes a heat sink 100, a support plate 200, a busbar assembly 300, a support frame 400, battery cells 500, and a cover plate 600.

First, the heat sink 100 is a flat plate that is provided with a flow channel defined therein and has a predetermined area. A plurality of protuberances 110 is formed on the upper surface and the lower surface of the heat sink 100 so as to protrude therefrom in a state of being spaced apart from each other by a predetermined distance. The protuberances 110 will be described below in detail.

The support plate 200 includes an upper support plate 210 and a lower support plate 220 located at opposite surfaces of the heat sink 100, more specifically the upper surface of the heat sink 100 and the lower surface of the heat sink 100, respectively.

The busbar assembly 300 configured to electrically connect the battery cells 500 to each other includes a first busbar assembly 310 and a second busbar assembly 320. The first busbar assembly 310 is located at the upper surface of the upper support plate 210, and the second busbar assembly 320 is disposed at the lower surface of the lower support plate 220.

A total of six first busbar assemblies 310, one of which is located in the vicinity of each of opposite edges of the upper support plate 210 and four of which are located between the two first busbar assemblies located in the vicinity of the opposite edges of the upper support plate in a state of being spaced apart from each other by a predetermined distance in a longitudinal direction (an X-axis direction), are shown in the figure, which, however, is merely an example. The number or position of first busbar assemblies may be changed as long as the first busbar assemblies can be brought into tight contact with the upper support plate 210.

The second busbar assemblies 320 are symmetrical with the first busbar assemblies 310, and therefore an additional description thereof will be omitted.

Next, the support frame 400 includes first support frames 410 and second support frames 420. The first support frames 410 are located between the upper support plate 210 and an upper cover plate 610, and the second support frames 420 are located between the lower support plate 220 and the lower cover plate 620. The first support frames and the second support frames will be described below in more detail.

The battery cells 500 include a plurality of first battery cells 510 and a plurality of second battery cells 520 located parallel to the heat sink 100. Specifically, the first battery cells 510 are located between the upper support plate 210 and the upper cover plate 610, and the second battery cells 520 are located between the lower support plate 220 and the lower cover plate 620.

The first battery cells 510 and the second battery cells 520 may be battery cells having the same construction. For example, each battery cell may include a cell case, in which an electrode assembly (not shown) is received, and a pair of electrode leads.

Here, the electrode assembly may be a jelly-roll type assembly, which is configured to have a structure in which a long sheet type positive electrode and a long sheet type negative electrode are wound in the state in which a separator is interposed therebetween, a stacked type assembly which is configured to have a structure in which a rectangular positive electrode and a rectangular negative electrode are stacked in the state in which a separator is interposed therebetween, a stacked and folded type assembly, which is configured to have a structure in which unit cells are wound using a long separation film, or a laminated and stacked type assembly, which is configured to have a structure in which battery cells are stacked in the state in which a separator is interposed therebetween and are then attached to each other. However, the present invention is not limited thereto. It is preferable for the electrode assembly according to the present invention to be a stacked and folded type assembly or a laminated and stacked type assembly, which has lowest physical stress when a curved module is formed.

The electrode assembly is received in the cell case. The cell case is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin based resin, such as polypropylene, polyethylene, Polyethylene acrylate, or polybutylene, a polyurethane resin, and a polyimide resin, which exhibit excellent chemical resistance and high sealability. However, the present invention is not limited thereto, and polypropylene, which exhibits excellent mechanical physical properties, such as tensile strength, rigidity, surface hardness, and impact strength resistance, and excellent chemical resistance, is the most preferably used.

The metal layer, which is disposed so as to abut the inner layer, corresponds to a barrier layer configured to prevent moisture or various kinds of gas from permeating into the battery from the outside. An aluminum thin film, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

Meanwhile, the pair of electrode leads is constituted by a positive electrode lead and a negative electrode lead, which may be exposed from the cell case in a state of being electrically connected respectively to positive electrode tabs and negative electrode tabs of the electrode assembly or may be directly connected to the electrode assembly in the state in which tabs are omitted.

Next, the cover plate 600 serves to protect the battery cells 500 from the outside, and includes an upper cover plate 610 and a lower cover plate 620.

Specifically, the upper cover plate 610 is located above the first battery cells 510 to protect the upper surfaces of the first battery cells 510, and the lower cover plate 620 is located above the second battery cells 520 to protect the lower surfaces of the second battery cells 520.

Each of the upper cover plate 610 and the lower cover plate 620 is provided with a plurality of through-holes formed so as to be spaced apart from each other by a predetermined distance such that the fastening members B are inserted therethrough.

FIG. 6 is a perspective view illustrating a coupling structure between the heat sink and the support plate in the battery module according to the preferred embodiment of the present invention.

Referring to FIG. 6, the upper support plate 210 is located at the upper surface of the heat sink 100 according to the present invention, and the lower support plate 220 is located at the lower surface of the heat sink 100.

Meanwhile, it is preferable for the protuberances 110 to be formed on the opposite surfaces of the heat sink 100, i.e. the upper surface and the lower surface of the heat sink, so as to protrude therefrom by a predetermined height while having a predetermined shape. It is more preferable for the upper support plate 210 to have first openings 211 config- ured to receive the protuberances 110 formed on the upper surface of the heat sink 100 and for the lower support plate 220 to have second openings 221 configured to receive the protuberances 110 formed on the lower surface of the heat sink 100.

When the upper support plate 210 and the lower support plate 220 are brought respectively into tight contact with the upper surface and the lower surface of the heat sink 100 having the protuberances 110 formed on the opposite sur- faces thereof, the protuberances 110 formed on the upper surface, of the heat sink 100 are inserted into the first openings 211, and the protuberances 110 formed on the lower surface of the heat sink 100 are inserted into the second openings 221, whereby rolling of the heat sink from side to side may be prevented.

Here, each of the upper support plate 210 and the lower support plate 220 may be made of a thermally conductive resin.

Meanwhile, a coolant inlet port 120 configured to supply a coolant is provided at one side of the heat sink 100, and a coolant outlet port 130 configured to discharge the coolant that has performed heat exchange is provided in the vicinity of the coolant inlet port. It is obvious that the coolant inlet port 120 and the coolant outlet port 130 are not necessarily located so as to be adjacent to each other as long as it is Possible to supply and discharge the coolant. In addition, the heat sink 100 and the support plate 200 are provided with through-holes, through fastening members B are inserted.

FIG. 7 is a perspective view illustrating a battery cell mounting structure in the battery module according to the preferred embodiment of the present invention, and FIG. 8 is a perspective view illustrating a support frame disposition structure is the battery module according to the preferred embodiment of the present invention.

The plurality of first battery cells 510 according to the present invention is horizontally seated on the protuberances 110 of the heat sink 100, exposed to the outside in a state of being inserted through the first openings 211 of the upper support plate 210, and the upper support plate 210.

A conventional battery module is configured to have a structure in which battery cells are located perpendicular to a heat sink, whereby contact area between the battery cells and the heat sink is small, and therefore cooling performance of the battery module is limited.

In contrast, the battery module 1000 according the present invention is configured to have a structure in which the first battery cells 510 are located parallel to the heat sink 100 and in which the horizontal side surfaces of the first battery cells 510 contact the protuberances 110 of the heat sink 100, whereby rapid heat transfer is achieved, and therefore heat transfer efficiency is improved.

Of course, it is obvious that the remaining portions of the first battery cells 510, which are not in tight contact with the protuberances 110 of the heat sink 100, are in tight contact with the upper support plate 210.

Meanwhile, a known thermally conductive resin layer may be interposed between each of the protuberances 110 and a corresponding one of the first battery cells 510 in order to fix the protuberance and the first battery cell to each other.

The structure in which the second battery cells 520 and the lower support plate 220 are mounted is identical to the structure in which the first battery cells 510 and the upper support plate 210 are coupled to each other except for only difference in direction, and therefore a detailed description thereof will be omitted.

As previously described, the support frame 400 includes the first support frames 410 and the second support frames 420.

The first support frames 410 are located between the upper support plate 210 and the upper cover plate 610, more specifically at opposite edges and the middle of the upper support plate 210 in the longitudinal direction of the battery module (the X-axis direction). Each of the first support frames is a bar that has a predetermined width, height, and length and that has an approximately quadrangular section. Each of the first support frames 410 is provided, with a plurality of first through-holes 411 formed so as to be spaced apart from each other by a predetermined distance such that the fastening members B can be inserted therethrough.

The second support frames 420 are identical in construc- tion to the first support frames 410 except that the second support frames are located between the lower support plate 220 and the lower cover plate 620. That is, each of the second support frames 120 is provided with a plurality of second through-holes 421 formed so as to be spaced apart from each other by a predetermined distance such that the fastening members B can be inserted therethrough.

Even though the plurality of battery modules 1000 is fastened to each other in a state of being stacked, the support plate 200 and the cover plate 600 may be maintained spaced apart from each other by a predetermined distance by the first support frames 410 and the second support frames 420, whereby it is possible to prevent the battery cells 500 from being pressed more than necessary and to inhibit local expansion at the time of swelling.

FIG. 9 is a perspective view illustrating a coupling structure between the battery cells and busbars in the battery module according to the preferred embodiment of the pres- ent invention.

When describing with further reference to FIG. 7, the busbar assembly 300 includes a first busbar assembly 310 and a second busbar assembly 320, which are identical in construction to each other except for only difference in disposition. Hereinafter, therefore, a description will be given based on the first busbar assembly 310.

The first busbar assembly 310 includes a first busbar frame 311 and busbars 312. The first busbar frame 311 is configured to electrically connect adjacent ones of the busbars 312 to each other while supporting the busbars 312. The first busbar frame 311 is provided with first receiving recesses 311(*a*) configured to receive the busbars 312 in a seated state and second receiving recesses 311(*b*) depressed deeper than the first receiving recesses 311(*a*).

Each of the busbars 312, which is configured to have a concave-convex structure that is bent at a predetermined angle a plurality of times, includes a first horizontal portion 312(*a*), a second horizontal portion 312(*b*) located lower than the first portion 312(*a*), and a connection portion 312(*c*) configured to connect the first horizontal portion 312(*a*) and the second horizontal portion 312(*b*) to each other, the connection portion being bent at a predetermined angle.

When the busbar 312 having the above construction is seated in the receiving recesses of the first busbar frame 311, the first horizontal portion 312(*a*) is inserted into the first receiving recess 311(*a*), and the second horizontal portion 312(*b*) is inserted into the second receiving recess 311(*b*), whereby the busbar 312 is securely fastened to the first busbar frame 311.

Meanwhile, an electrode lead 511 of each of the first battery cells 510 is seated on the first horizontal portion 312(*a*).

The conventional battery module has no function of cooling the busbar assembly 300 or further needs to have such a cooling function. In the present invention, however, the busbar assembly 300 is located in surface contact on the upper support plate 210 and the lower support plate 220 located respectively at the upper surface and the lower surface of the heat sink 100, whereby it is possible to cool the busbar assembly 300 using only the heat sink 100, which is configured to cool the battery cells, and therefore it is possible to minimize an increase in volume of the battery module.

The present invention may provide a battery pack including a battery module 1000 having at least one of the above-mentioned features, and the battery pack may be mounted in a device, such as an electric vehicle, a hybrid electric vehicle, or a plug-in hybrid electric vehicle.

Those skilled in the art to which the present invention pertains will appreciate that various applications and modifications are possible within the category of the present invention based on the above description.

DESCRIPTION OF REFERENCE SYMBOLS

1000: Battery module
100: Heat sink
110: Protuberance
120: Coolant inlet port
130: Coolant outlet port
200: Support plate
210: Upper support plate
211: First opening
220: tower support plate
221: Second opening
300: Busbar assembly
310: First busbar assembly
311: First busbar frame
311(*a*): First receiving recess 311(*b*): Second receiving recess
312: Busbar

312(*a*): First horizontal portion 312(*b*): Second horizontal portion
312(*c*): Connection portion
320: Second busbar assembly
400: Support frame
410: First support frame 411: First through-hole
420: Second support frame 421: Second through-hole
500: Battery cell
510: First battery cell
511: Electrode lead
520: Second battery cell
600: Cover plate
610: Upper cover plate
620: Lower cover plate
B: Fastening member

The invention claimed is:

1. A battery module comprising:
a heat sink having a predetermined area, the heat sink being horizontally located;
a support plate comprising an upper support plate and a lower support plate located respectively at an upper surface and a lower surface of the heat sink;
a battery cell comprising a first battery cell disposed in contact with the upper support plate and a second battery cell disposed in contact with the lower support plate; and
a cover plate comprising an upper cover plate located above the first battery cell and a lower cover plate located under the second battery cell,
wherein the heat sink is provided on the upper surface thereof with a protuberance protruding by a predetermined height, and
wherein the upper support plate is provided with a first opening configured to receive the protuberance.

2. The battery module according to claim 1, wherein the first battery cell is located at an upper surface of the protuberance.

3. The battery module according to claim 1, wherein the heat sink is provided on the lower surface thereof with a protuberance protruding by a predetermined height, and wherein the lower support plate is provided with a second opening configured to receive the protuberance.

4. The battery module according to claim 3, wherein the second battery cell is located at a lower surface of the protuberance.

5. The battery module according to claim 2, further comprising a thermally conductive resin layer interposed between the first battery cell and the protuberance.

6. The battery module according to claim 1, further comprising first support frames located between the upper support plate and the upper cover plate so as to extend along opposite edges of each thereof while having a predetermined height and width.

7. The battery module according to claim 6, wherein one first support frame among the first support frames is located between the upper support plate and the upper cover plate so as to extend along a middle of each thereof while having a predetermined height and width.

8. The battery module according to claim 1, further comprising second support frames located between the lower support plate and the lower cover plate so as to extend along opposite edges of each thereof while having a predetermined height and width.

9. The battery module according to claim 8, wherein one second support frame among the second support frames is located between the lower support plate and the lower cover plate so as to extend along a middle of each thereof while having a predetermined height and width.

10. The battery module according to claim 1, further comprising a first busbar assembly located between the upper support plate and the upper cover plate.

11. The battery module according to claim 10, wherein the first busbar assembly comprises:

a first busbar frame having a first receiving recess formed therein; and P1 a busbar seated in the first receiving recess, the busbar being configured to have a concave-convex structure that is bent at a predetermined angle a plurality of times.

12. The battery module according to claim 1, further comprising a second busbar assembly located between the lower support plate and the lower cover plate.

13. A battery pack comprising the battery module according to claim 1, wherein the battery module is stacked in plural so as to be disposed side by side in a vertical direction.

14. A device comprising the battery pack according to claim 13.

15. The battery module according to claim 4, wherein a thermally conductive resin layer is interposed between the second battery cell and the protuberance.

16. The battery module according to claim 1, wherein the heat sink is horizontally located in a plane direction of the battery module.

17. The battery pack according to claim 13, wherein the vertical direction is a thickness direction of the battery module.

18. The battery module according to claim 1, wherein a portion of the first battery cell directly contacts the protuberance on the upper surface of the heat sink.

19. The battery module according to claim 1, wherein the first battery cell is horizontally seated on the protuberance of the heat sink.

\* \* \* \* \*